May 6, 1969 J. R. LEWIS ET AL 3,442,323
APPARATUS FOR MAKING BATTERY CABLE TERMINALS
Filed May 19, 1966 Sheet 1 of 2

INVENTORS.
JACK R. LEWIS
GEORGE D. NAGLE
BY
ATTORNEY

May 6, 1969        J. R. LEWIS ET AL        3,442,323
APPARATUS FOR MAKING BATTERY CABLE TERMINALS
Filed May 19, 1966        Sheet 2 of 2
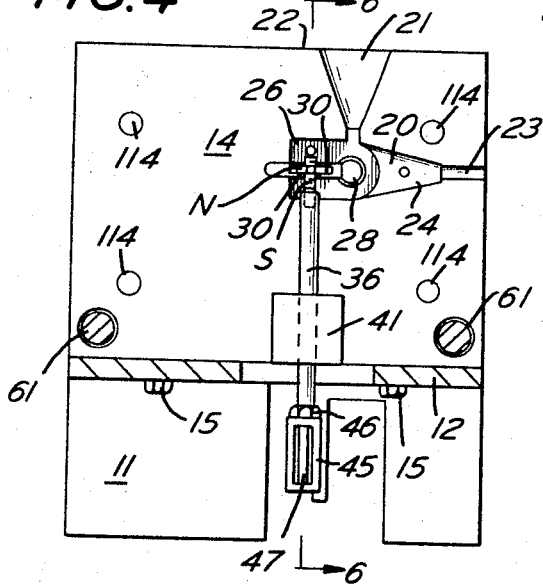
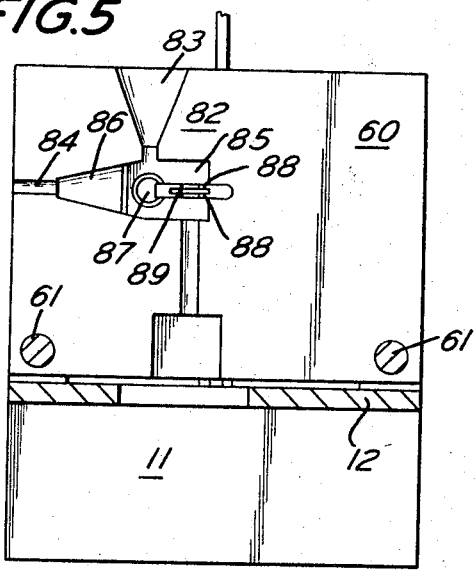
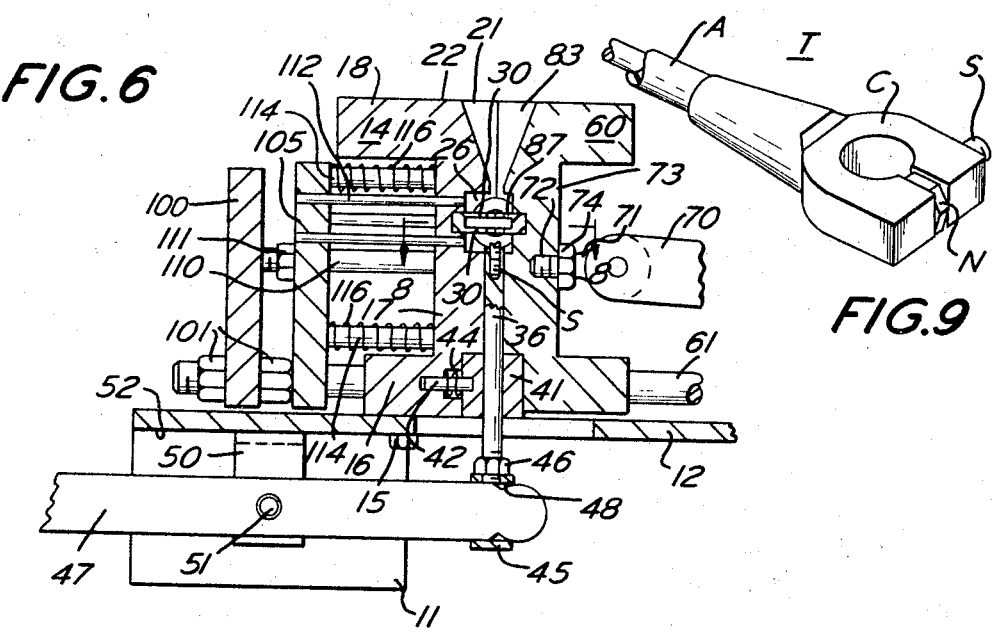
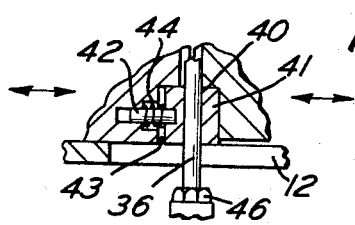
INVENTORS.
JACK R. LEWIS
GEORGE D. NAGLE
BY
ATTORNEY United States Patent Office 3,442,323
Patented May 6, 1969

3,442,323
APPARATUS FOR MAKING BATTERY
CABLE TERMINALS
Jack R. Lewis, Norristown, and George D. Nagle, Conshohocken, Pa., assignors to Keystone Cable Corporation, Philadelphia, Pa., a corporation of Pennsylvania
Filed May 19, 1966, Ser. No. 551,310
Int. Cl. B22d 19/00
U.S. Cl. 164—332                                    5 Claims

ABSTRACT OF THE DISCLOSURE

Apparatus is provided for making battery cable terminals which includes relatively movable die members having an interior terminal forming cavity with openings for insertion of a cable and for the introduction of molten metal to be shaped by the interior space. A stud supporting member is provided movably mounted with respect to the die members for supporting a stud within the space in predetermined relation to partition walls which separate free clamping ends of the terminal. The stud supporting member is movable into engagement with a wall portion of one of the partition walls and mounting portions of the stud supporting member are movable in a plurality of directions one of which is perpendicular to the other.

This invention relates to apparatus for making moulded metal battery cable terminals and more particularly to such an apparatus that has automatic adjustable terminal insert locating and positioning means.

The principal object of the present invention is to provide apparatus for making moulded battery cable terminals which accurately and easily positions a threaded insert in the moulding die.

It is a further object of the present invention to provide apparatus for making moulded battery cable terminals that is simple and inexpensive to construct but sturdy and reliable in operation.

It is a further object of the present invention to provide an apparatus for making moulded battery cable terminals that automatically ejects the moulded terminal from the die when the moulding process is completed.

It is a further object of the present invention to provide an apparatus for making moulded battery cable terminals that is easy to operate and which provides a finished product of attractive appearance and high quality.

Other objects and advantageous features of the invention will be apparent from the description and claims.

The nature and characteristic features of the invention will be more readily understood from the following description taken in connection with the accompanying drawings forming part thereof, in which:

FIG. 4 is a vertical sectional view taken approximately on the line 4—4 of FIG. 1;

FIG. 5 is a vertical sectional view taken approximately on the line 5—5 of FIG. 1;

FIG. 6 is a vertical sectional view taken approximately on the line 6—6 of FIG. 4;

FIG. 7 is a fragmentary sectional view of part of the apparatus shown in FIG. 6 with one half of the die portion of the apparatus in motion;

FIG. 9 is an enlarged view in perspective of a battery cable terminal as produced by the apparatus of the present invention.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, a battery cable terminal T is illustrated in FIG. 9 which is similar to that shown in our prior application for patent filed Nov. 9, 1965, Ser. No. 506,929 and which includes a clamp C connected to the cable A, with an end slotted and threaded stud or shank S, inner nut N and tightening nut (not shown).

Figure 1:
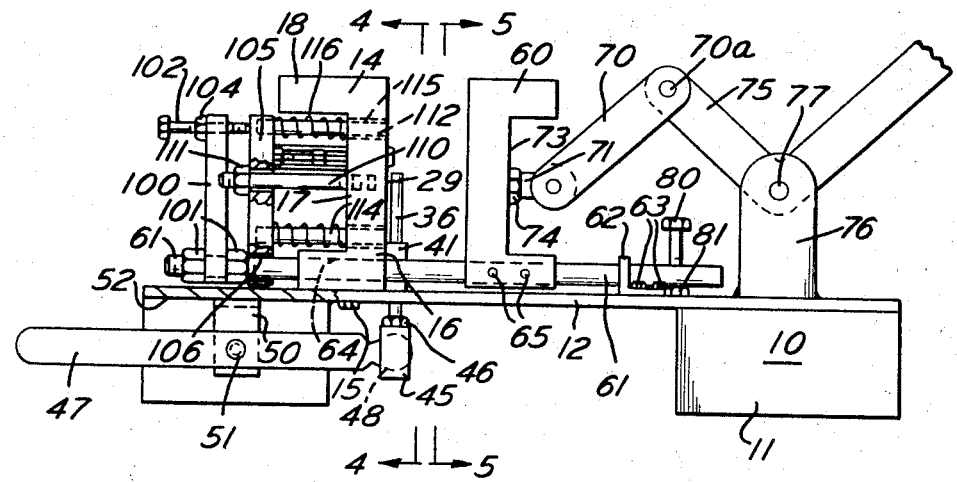
FIG. 1 is a side view of the apparatus in accordance with the present invention, parts being broken away to show interior construction details.
Figure 2:
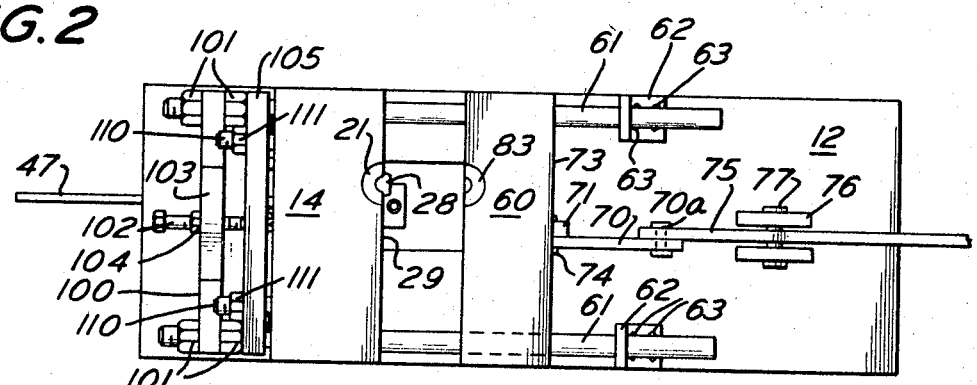
FIG. 2 is a top plan view of the apparatus shown in FIG. 1.
Figures 3, 8:
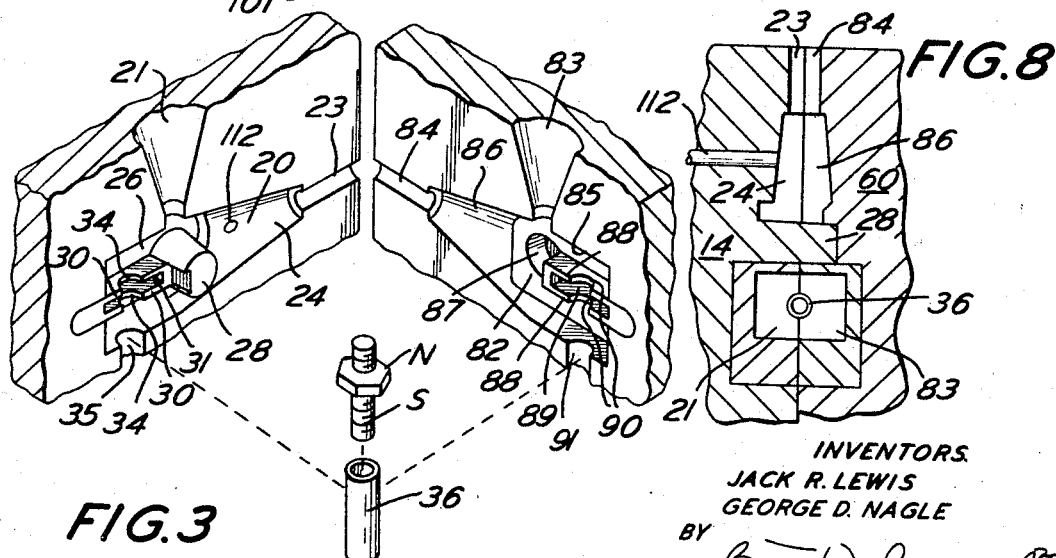
FIG. 3 is a perspective view, enlarged, with the halves of the die swung apart to show the inner details of construction.
FIG. 8 is a horizontal sectional view, enlarged, taken approximately on the line 8—8 of FIG. 6.

Referring now more particularly to FIGS. 1 to 8, inclusive, the apparatus therein illustrated is especially suited for making battery cable terminals as shown in FIG. 9.

The apparatus illustrated in FIGS. 1 to 8 includes a frame 10 consisting of lengthwise extending side channels 11 connected by an upper horizontal plate 12. A stationary vertical die half 14 is provided attached to the plate 12 by bolts 15. The die 14 has a lower horizontal attachment portion 16 with an integral vertical upwardly extending moulding portion 17 and horizontal top plate portion 18 connected thereto. The stationary die half 14 in the moulding portion 17 has a moulding cavity 20 therein for reception of the material to be moulded.

The cavity 20 has one half of funnel shaped metal entrance hole 21 formed in the portion 17. The hole 21 extends upwardly and outwardly terminating at the top 22 of the top plate 18. One half of a cable receiving semi-cylindrical hole 23 is formed in the die portion 17, the hole 23 communicating with the cavity 20 and the outside of the vertical moulding portion 17, suitable for reception and retention of a conventional battery cable A during the moulding process.

Inwardly of the semicylindrical hole 23 one half of a frustoconical surface 24 is formed in the cavity 20, with its apex at the inner end of the cylindrical hole 23. From the base end of the cone 24 and extending around and to the left from its edges a yoke shaped portion 26 is formed in the cavity 20. In the center thereof and between the halves of yoke portion 26 a tapered post 28 is provided with its large end in the base of the cavity and the taper diminishing outwardly, the post 28 cooperating to form a hole in the battery cable terminal at the clamp C suitable for the reception of a battery post in assembled position.

On the side of post 28 opposite to the cone 24 two horizontal partition walls 30 are provided flush with the facing surface 29 of moulding portion 17 extending from post 28 to the end of yoke 26 and integral with die 14 and spacing the free ends of the clamp C. A cavity 31 is formed thereby between the walls 30 for the reception of a nut N which is on a slotted stud S which is moulded into the cable terminals. Each wall 30 has a semicylindrical hole 34 cut out to provide clearance for the stud S during moulding. An additional cut out 35 is provided in the lower portion 16 of the die 14 and provides clearance for a hollow sleeve 36 carrying the stud S which is to be moulded into the battery cable terminal.

The sleeve 36 extends vertically downwardly in the cut out 35 and passes through a bore 40 in a block 41. The block 41 is carried on a horizontal shaft 42 and extends into a cavity 43 in the lower portion 16 of die 14. The block 41 is held out of engagement with the cavity 43 by a spring 44 on the shaft 42 between the block 41 and cavity 43. The sleeve 36, below the block 41, is threadably engaged in a ring 45 and retained from rotational movement therein by a nut 46. A positioning lever 47 is engaged in the center 48 of ring 45, the ring 45 being free to slide therealong as lever 47 is moved. The lever 47 is pivotally mounted on a vertical plate 50 by pin 51, the plate 50 is fastened to the underside 52 of plate 12.

A movable die half 60 is provided in opposing facing relation to the fixed die half 14. The movable die 60 is carried on horizontal shafts 61 which are slidably journaled at the right hand end in brackets 62 fastened to plate 12 by bolts 63. The shafts 61 are journaled at the left hand end in bores 64 in the lower portion 16 of the die 14 and free to move therein.

The die half 60 is retained on the shafts 61 by any suitable means such as by set screws 65.

A lever 70 is provided pivotally engaged with a bolt 71 which is threadably engaged in a hole 72 in the back 73 of the die 60 with a nut 74 bearing on the back 73 and preventing rotation. An additional L-shaped lever 75 is pivotally attached to the lever 70 by pin 70a and mounted on a vertical column 76 by a pin 77.

The column or post 76 is fastened to the plate 12 of the frame 10 in any suitable manner. A stop bolt 80 is provided to limit the counterclockwise downward travel of lever 75, and is threadably engaged in the plate 12 of frame 10 and restrained from rotation by a nut 81.

The movable die half 60 is provided with a moulding cavity 82 similar to that of the stationary die half 14. The moulding cavity 82 has the other half 83 of the metal entrance hole 21 formed therein, has a semicylindrical cable hole 84 for reception with the hole 23 of cable A, and frustoconical surface 86 similar but of opposite hand to the hole 23 and cone 24. A yoke shaped cut out 85 is provided similar to the yoke 26 of die 14 but of opposite hand.

A hole 87 is provided in center of yoke 26 to receive the tapered post 28 when the die halves are in moulding position.

Horizontal separation walls 88 are provided similar to walls 30 of die 14 and with a cavity 89 therebetween and has cut outs 90 to provide clearance for sleeve 36 and stud S. A cut out 91 is formed in the die 60 similar to cut out 35 of die 14 to provide clearance for sleeve 36.

The die 14 at the rear thereof is provided with additional mechanism for removing the completed moulded terminal from the moulding cavity 20.

The mechanism for removing the moulded battery cable terminal from the cavity 20 includes a substantially triangular vertical plate 100 carried on the left hand end of the two shafts 61. The plate 100 is retained on shafts 61 by nuts 101 on either side of the plate 100.

A bolt 102 is threadably engaged in the upper triangular portion 103 of plate 100 with a nut 104 bearing thereagainst and restraining the bolt 102 from rotation.

A substantially rectangular plate 105 is provided interiorly of the plate 100 carried on shafts 61, with the shafts 61 in bores 106 in plate 105 which shafts 61 are slidable therein.

Two bolts 110 are provided threadably engaged in the die 16 and extending horizontally rearwardly through holes in plate 105 with adjusting nuts 111 thereon and serve to limit the outward travel of the plate 105.

Knock out pins 112 and 114 are provided threadably engaged in the plate 105 and extending horizontally forwardly of plate 105 through bores 115 in die 16 with coil springs 116 on pins 112 interposed between the plate 104 and die 16 urging them apart.

The knock out pins 112 extend to the edge of cone 24 and yoke 26 in out of engagement position.

The pins 114 extend to the facing surface 29 of die 16 and therebeyond when in engaged position.

The mode of operation will now be pointed out.

When it is desired to mould battery cable terminals a piece of battery cable C is prepared by stripping off insulation a suitable distance and the end then placed in hole 23 in die 14, the exposed cable extending into the void formed by surface 24.

A stud S with nut N thereon is placed in sleeve 36 and vertically positioned by lever 47 and block 45.

The lever 75 is moved sharply to the left in a counterclockwise motion until it is stopped by bolt 86.

The die 60 is moved to the left by lever 75, pin 70a, lever 70 and bolt 71. At the same time the plate 100 carried on shaft 61 which supports die 60 and is fastened thereto is moved to the left. Pins 112 and 114 are moved to an out of engagement position.

Molten metal poured into hole 21 flows down between the dies 60 and 14 into the cavities 20 and 82 out into the void between 86 and 24 over the cable in this void and forward over yokes 26 and 85.

When the metal has hardened the lever 75 is moved sharply to the right in a clockwise direction thereby unlocking the dies and moving die 60 to the right. Further movement of lever 75, die 60 and shaft 61 moves bolt 102 on plate 100 into engagement with plate 105, and plate 105 is moved to the right compressing springs 116 on pins 112 and 114 and forcing them to contact the moulded cable terminal and remove it from cavity 20. The cable is held in sleeve 36 by stud S and can be lifted out and the cycle repeated.

We claim:

1. Apparatus for making battery cable terminals comprising:
    a first die member,
    a second die member movable with respect to said first die member,
    said die members being shaped to provide an interior terminal forming cavity with an opening extending to the exterior for the insertion of a cable and another opening extending to the exterior for introduction of metal for shaping by said interior space to provide the terminal,
    a stud supporting member movably mounted with respect to at least one of said die members and having a portion extending between said die members for supporting a stud in intersecting relation to said interior space, and
    partition walls transversely disposed with respect to the axis of said stud supporting member for separating free clamping ends of the terminal,
    said partition walls having spaced wall portions providing an opening therebetween isolated from said cavity,
    said stud supporting member being movable into engagement with one of said spaced wall portions.

2. Apparatus for making battery cable terminals as defined in claim 1 in which said stud supporting member has portions for inward and outward adjustment with respect to said cavity.

3. Apparatus for making battery cable terminals as defined in claim 1 in which said stud supporting member has mounting portions for movement in a plurality of directions one of which is perpendicular to the other.

4. Apparatus for making battery cable terminals as defined in claim 1 in which
    one of said die members has a post extending into the other of said die members in closed position,
    said post being in closely spaced relation to said partition walls.

5. Apparatus for making battery cable terminals as defined in claim 1 in which
    a frame is provided,
    one of said die members is fixedly mounted with respect to said frame,
    the other of said die members is movably mounted with respect to said frame, and said stud supporting member is movably mounted with respect to both of said die members.

References Cited

UNITED STATES PATENTS

| | | | |
|---|---|---|---|
| 1,782,447 | 11/1930 | Scrantom | 18—36 |
| 1,911,040 | 5/1933 | Schultz | 164—334 |
| 2,012,548 | 8/1935 | Roehri | 164—340 |
| 2,856,639 | 10/1958 | Forrest et al. | 264—272 |
| 2,957,214 | 10/1960 | Kuharski | 249—88 |
| 3,020,608 | 2/1962 | Gelfand | 249—96 X |
| 3,108,328 | 10/1963 | Kelleher | 18—36 |
| 3,161,918 | 12/1964 | Zearbaugh | 164—340 X |

J. SPENCER OVERHOLSER, *Primary Examiner.*

EUGENE MAR, *Assistant Examiner.*

U.S. Cl. X.R.

18—5; 164—112, 334, 340, 347; 249—85, 88; 264—272